(12) United States Patent
Mitani et al.

(10) Patent No.: US 6,941,826 B2
(45) Date of Patent: Sep. 13, 2005

(54) METHOD AND DEVICE FOR DETECTING ABRASIONS OF ELECTRODES IN STATIONARY WELDING GUN

(75) Inventors: Yasutaka Mitani, Fukuoka (JP); Hiromi Ohba, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/479,239

(22) PCT Filed: May 30, 2002

(86) PCT No.: PCT/JP02/05321
§ 371 (c)(1),
(2), (4) Date: Dec. 1, 2003

(87) PCT Pub. No.: WO02/098594
PCT Pub. Date: Dec. 12, 2002

(65) Prior Publication Data
US 2004/0144157 A1 Jul. 29, 2004

(30) Foreign Application Priority Data
Jun. 1, 2001 (JP) .................................... 2001-166917

(51) Int. Cl.[7] .......................... B23K 31/02; B23K 11/25; G01M 19/00
(52) U.S. Cl. .................... 73/865.8; 219/61.5; 219/91.1; 219/121.28
(58) Field of Search .................. 73/865.8; 219/61.5, 219/85.16, 86.23, 86.41, 91.1, 119, 121.28, 162; 33/1 BB, 1 L; 250/559.19, 559.2, 559.23, 559.29

(56) References Cited

U.S. PATENT DOCUMENTS 3,708,648 A * 1/1973 Croucher et al. ........... 219/109
4,811,113 A * 3/1989 Ozeki et al. ................ 382/245
4,912,294 A * 3/1990 Tsujii ....................... 219/86.24
4,999,475 A * 3/1991 Yasuge .................... 219/86.41
6,191,381 B1 * 2/2001 Kabir ..................... 219/121.52
6,201,206 B1 * 3/2001 Kitamura ................... 219/109
6,274,840 B1 * 8/2001 Kanjo ..................... 219/86.41
6,696,660 B2 * 2/2004 Nastasi, Jr. ................ 219/109
6,750,418 B1 * 6/2004 Nastasi, Jr. ................ 219/109
2002/0134762 A1 * 9/2002 Okanda et al. ........... 219/86.51

FOREIGN PATENT DOCUMENTS

| JP | 01215474 A | * | 8/1989 | .......... B23K/11/24 |
| JP | 01215475 A | * | 8/1989 | .......... B23K/11/24 |
| JP | 06031460 A | * | 2/1994 | .......... B23K/11/24 |
| JP | 09070675 A | * | 3/1997 | .......... B23K/11/24 |
| JP | 11-28578 A | | 2/1999 | |
| JP | 11-33734 A | | 2/1999 | |
| JP | 2000-317646 A | | 11/2000 | |

* cited by examiner

Primary Examiner—Hezron Williams
Assistant Examiner—David A. Rogers
(74) Attorney, Agent, or Firm—Sughrue Mion, PLLC

(57) ABSTRACT

A method for detecting abrasion of both a moving side electrode (2) and a fixing side electrode (3) of a stationary type welding gun in which the moving side electrode (2) and the fixing side electrode (3) opposed to the moving side electrode (2) are provided and a workpiece (W) held by a robot (R) is to be welded, wherein reference positions of electrode ends of both of the electrodes (2) and (3) are read by an electrode end detecting device (7) attached to the robot (R), positions of the electrode ends are then detected by the electrode end detecting device (7) in a middle of welding, and amounts of abrasion of both of the electrodes (2) and (3) are calculated from a difference between the reference positions.

2 Claims, 5 Drawing Sheets

METHOD AND DEVICE FOR DETECTING ABRASIONS OF ELECTRODES IN STATIONARY WELDING GUN

TECHNICAL FIELD

The present invention relates to a method and apparatus for detecting the abrasion of an electrode of a stationary type welding gun.

BACKGROUND ART

For a stationary type welding gun in which a welding workpiece is held by the hand of a robot and is fixed to the ground, a moving side electrode is moved by a driving source such as an air cylinder or a servomotor (a servomotor for a gun) and a welding object is interposed between the moving side electrode and a fixing side electrode making a pair, and is pressurized and held and a large current is caused to flow, resulting in the execution of welding. Due to the pressurization and welding heat in the welding, both of the electrodes making a pair are gradually abraded. For this reason, conventionally, a stationary type gun provided with an equalizing mechanism capable of vertically rocking a welding gun itself by using a spring or a balance cylinder is utilized, or the hand of the robot is caused to comprise a floating device having the same function even if the equalizing mechanism is not provided, and the former gun carries out the equalization in the welding or absorption is performed by the hand of the robot as in the latter case. Thus, a countermeasure has been taken by using a rough welding method capable of ignoring the amount of abrasion of a chip to carry out the welding using these technical manners without detecting the amount of the abrasion of the chip.

However, there is such a defect that the equalizing mechanism and the floating device of the hand are expensive. Furthermore, an electric welding gun using a servomotor has spread. If the amount of abrasion can be grasped by the robot, it is possible to always maintain the positional relationship of an electrode chip with respect to a workpiece by taking the amount of abrasion into account to put the workpiece in the stationary type welding gun. Consequently, it is possible to obtain welding which is stable in respect of quality of the welding.

DISCLOSURE OF THE INVENTION

Therefore, it is an object of the invention to provide a method and apparatus for detecting the abrasion of an electrode of a stationary type welding gun which can accurately detect the amount of abrasion of the electrode of the stationary type welding gun by means of a robot.

The invention provides a method for detecting abrasion of both a moving side electrode and a fixing side electrode of a stationary type welding gun in which the moving side electrode and the fixing side electrode opposed to the moving side electrode are provided and a workpiece held by a robot is to be welded, wherein reference positions of electrode ends of both of the electrodes are read by an electrode end detecting device attached to the robot, positions of the electrode ends are then detected by the electrode end detecting device in a middle of welding, and amounts of abrasion of both of the electrodes are calculated from a difference between the reference positions.

Moreover, the invention provides an apparatus for detecting abrasion of an electrode of a stationary type welding gun, wherein an electrode end detecting device for detecting electrode ends of both a moving side electrode and a fixing side electrode of the stationary type welding gun in which the moving side electrode and the fixing side electrode opposed to the moving side electrode are provided is attached to a robot, and there is provided a calculating section for reading reference positions of the electrode ends of both of the electrodes by the electrode end detecting device, then detecting positions of the electrode ends by the electrode end detecting device in a middle of welding, and calculating amounts of abrasion of both of the electrodes from a difference between the reference positions.

BEST MODE FOR CARRYING OUT THE INVENTION

First Embodiment

Figure 1:
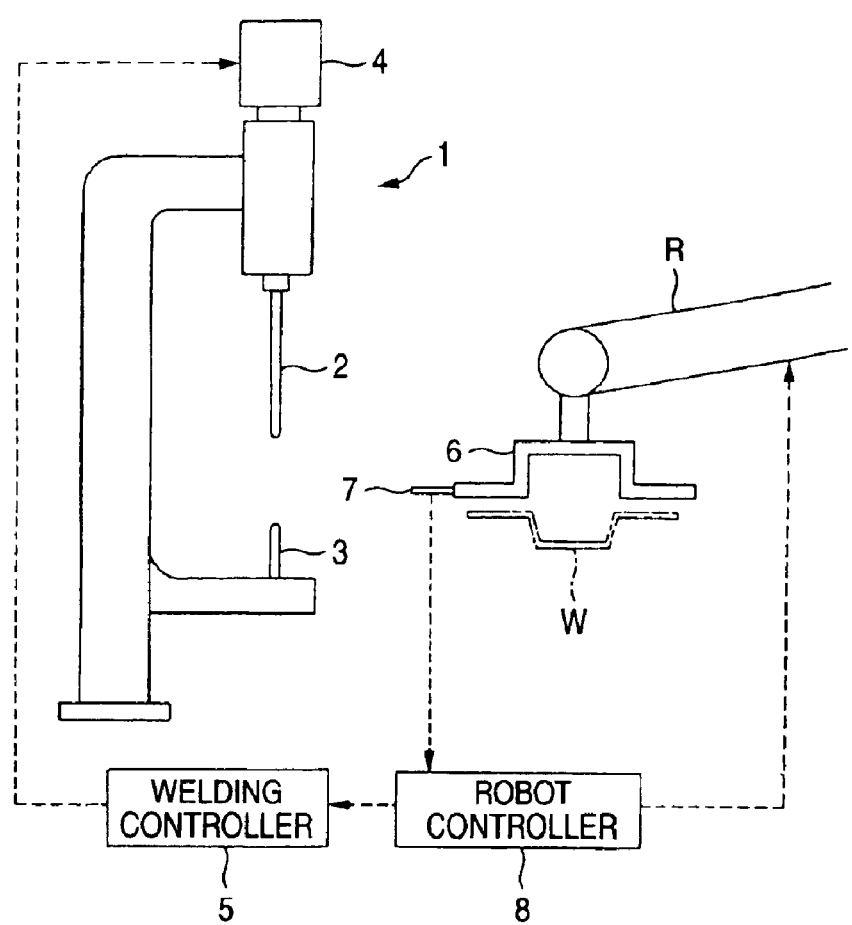
FIG. 1 is a view showing the structures of a stationary welding gun and a welding robot according to an embodiment of the invention.

FIG. 1 is a view showing the structures of a stationary type welding gun and a welding robot according to an embodiment of the invention. A stationary type welding gun 1 comprises a movable side electrode 2 and a fixing side electrode 3 opposed to the movable side electrode 2, and the movable side electrode 2 carries out a closing operation and an opening operation by means of a servomotor 4 to be a driving source. The operation of the stationary type welding gun 1 is controlled by a welding controller 5.

A welding robot R comprises a hand 6 for holding a workpiece W, and a non-contact sensor is attached as an electrode end detecting device 7 for detecting an electrode end to the terminal of the hand 6 in order to detect the abrasion of the electrodes 2 and 3. The operation of the welding robot R is controlled by a robot controller 8.

Figure 2:
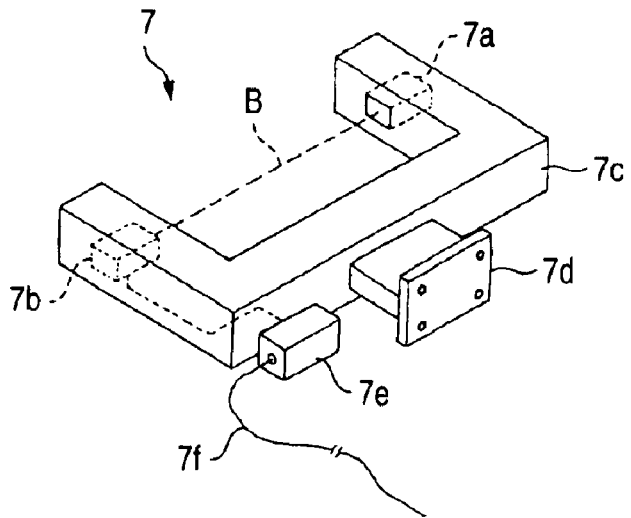
FIG. 2 is a schematic view showing an example of a non-contact sensor as an electrode end detecting device.

FIG. 2 is a schematic view showing an example of a non-contact sensor to be the electrode end detecting device. In the non-contact sensor, a light emitting section 7a for emitting a beam B and a light receiving section 7b for receiving the beam B are attached to a forked frame 7c opposite to each other and are coupled to a hand through a bracket 7d. The elements of the light emitting section 7a and the light receiving section 7b are connected to the robot controller 8 by a sensor cable 7f through an amplifier 7e for electric conversion. The non-contact sensor detects an electrode end by moving the movable side electrode 2 or the fixing side electrode 3 through the robot R in such a direction as to cross the beam B.

Figure 3:
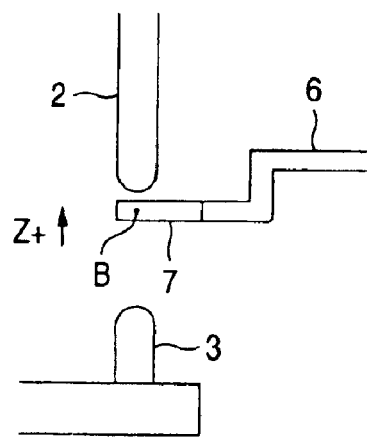
FIG. 3 is an explanatory view showing the detection of an electrode end by the non-contact sensor.
Figure 3:
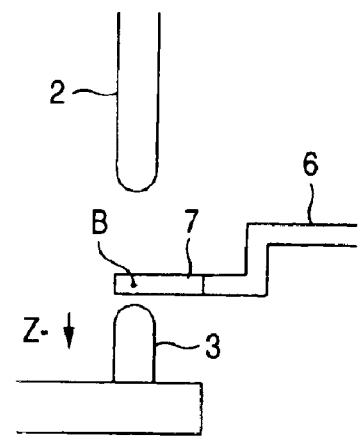

FIG. 3 is an explanatory view showing the detection of the electrode end by the non-contact sensor.

The positions of the electrode ends to be the reference positions of the movable side electrode 2 and the fixing side electrode 3 are detected before welding. It is preferable that the positions of the electrode ends to be the reference positions should be set when the electrodes are brand-new. As shown in FIG. 3 (a), the robot R moves the non-contact sensor 7 to be the electrode end detecting device in such a manner that the beam B goes toward the movable side electrode 2. When the electrode end is detected by the beam B, the robot R carries out search and detection in a Z+ direction of tool coordinates and the reference position of the movable side electrode 3 is read. The reference position thus read is once stored in the robot controller.

Then, the non-contact sensor 7 is moved in such a manner that the beam B goes toward the fixing side electrode 3. The search and detection is carried out in a Z− direction to read the reference position of the fixing side electrode 3. The reference position thus read is once stored in the robot controller.

When the workpiece W is pressurized and held by both of the electrodes 2 and 3 to cause a large current to flow and to repeat welding, thereafter, the electrodes 2 and 3 are gradually abraded. For this reason, it is necessary to detect the amounts of abrasion of the movable side electrode 2 and the fixing side electrode 3 during the operation of the robot R and to correct the amounts of movement of the movable side electrode 2 and the robot R. When the search and detection is carried out in the same manner as the detection of the reference position for the movable side electrode 2 and the fixing side electrode 3 after the welding, the position of the abraded electrode end which is detected is detected. An amount LU of abrasion of the movable side electrode and an amount LW of abrasion of the fixing side electrode are obtained from a difference between the position of the abraded electrode end thus detected and the reference position.

Next description will be given to the relationship between the amounts LU and LW of abrasion thus detected and the operations of the movable side electrode and the robot.

Figure 4:
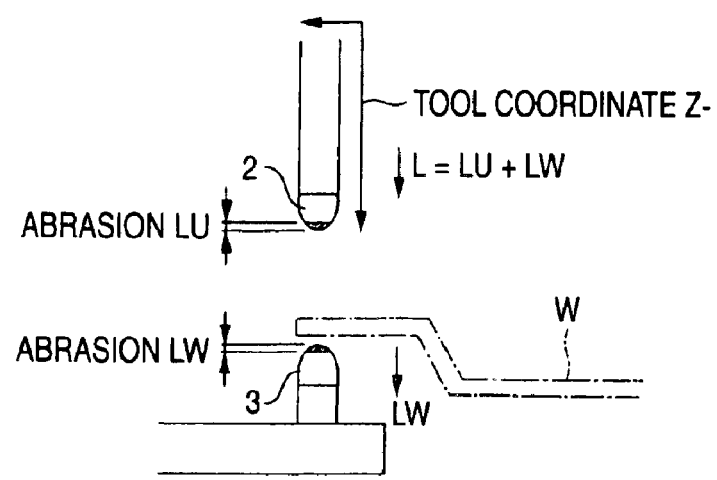
FIG. 4 is an explanatory view showing a correcting operation based on an amount of abrasion.

FIG. 4 is an explanatory view showing a correcting operation based on the amount of abrasion.

In case of an electric type welding gun shown in FIG. 4, the amount LU of abrasion of the movable side electrode and the amount LW of abrasion of the fixing side are converted to the amount of shift of the motor of the stationary type welding gun in order to adapt the workpiece W held by the hand 6 of the robot R to an abrasion correcting direction in the welding attitude of the stationary type gun, and the movable side electrode is shifted and moved in such a direction as to pressurize the workpiece W. The direction is a closing direction by the total amount of LW and LU in a manual manipulation or an automatic operation.

Moreover, the amount LW of abrasion of the fixing side is converted to the amount of shift of the tool coordinates of the hand of the robot, and the workpiece W held by the hand 6 is moved by LW in the Z− direction of the tool coordinates through the robot R.

All position data on both of the electrodes 2 and 3 obtained by the detecting operation and a position data difference are position data on the robot R. When they are transmitted to the component of the amount of movement of the movable side electrode, it is necessary to convert the robot position data into movable side electrode position data because the resolution of the movable side electrode, i.e., a distance by which the movable side electrode proceeds with respect to the number of rotations of the motor is defined.

Second Embodiment

Figure 5:
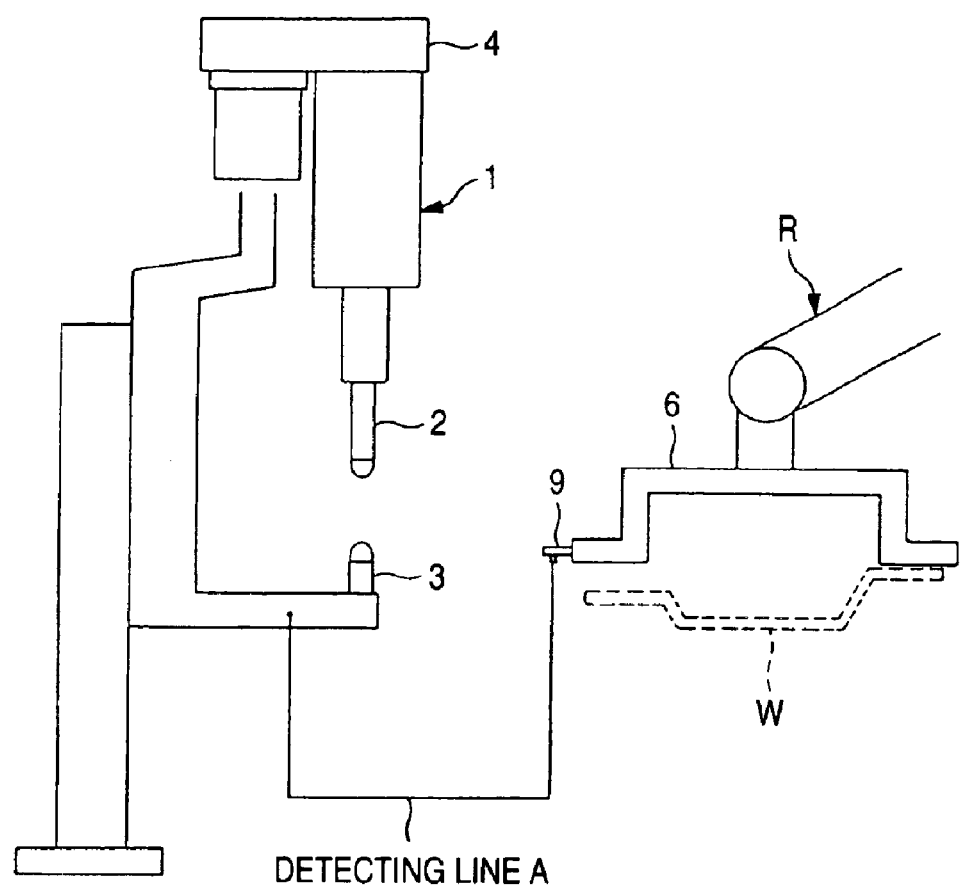
FIG. 5 is a view showing the structures of the stationary type welding gun and the welding robot according to the invention.

FIG. 5 is a view showing the structures of the stationary type welding gun and the welding robot according to the invention, and a stationary type welding gun 1 comprises a movable side electrode 2 for carrying out closing and opening operations by means of a servomotor 4 to be a driving source, and a fixing side electrode 3 provided opposite to the movable side electrode 2.

A welding robot R comprises a hand 6 for holding a workpiece W, and a contact 9 to be an electrode end detecting device for detecting an electrode end is attached to the terminal of the hand 6.

Figure 6:
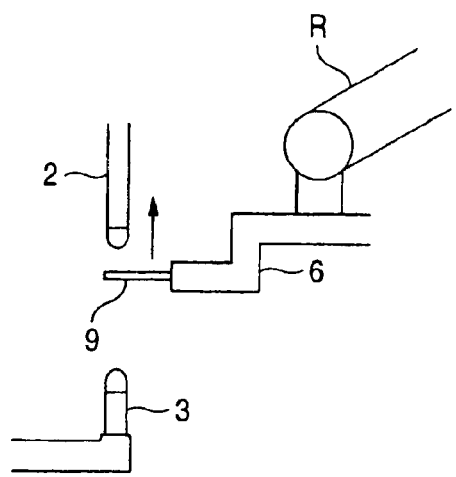
FIG. 6 is an explanatory view showing the detection of the electrode end by a contact and the correcting operation based on the amount of abrasion.
Figure 6:
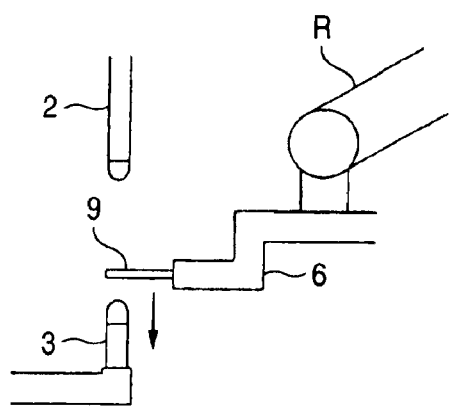
Figure 6:
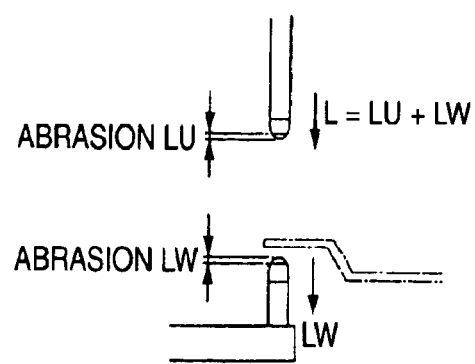

As shown in FIGS. 6(a) and (b), when the contact 9 comes in contact with the electrode end, i.e., the contact 9 and the electrode 2 or 3 are electrically conducted in the embodiment, the position coordinates of the robot in that position are stored in a robot controller.

In the calculation of an amount of abrasion, an amount LU of abrasion of the movable side electrode 2 and an amount LW of abrasion of the fixing side electrode 3 are obtained from a difference between the coordinates of the reference positions of the movable side electrode 2 and the fixing side electrode 3, i.e., the reference position of the robot obtained when the contact comes in contact with each of the electrode ends and the coordinates of the position of the robot obtained when the contact comes in contact with the tip of an electrode chip after welding.

As shown in FIG. 6(c)), based on the amounts LU and LW of abrasion thus calculated, the movable side electrode 2 is shifted by LU+LW and the hand is shifted by LW toward the fixing side electrode 3 side.

Figure 7:
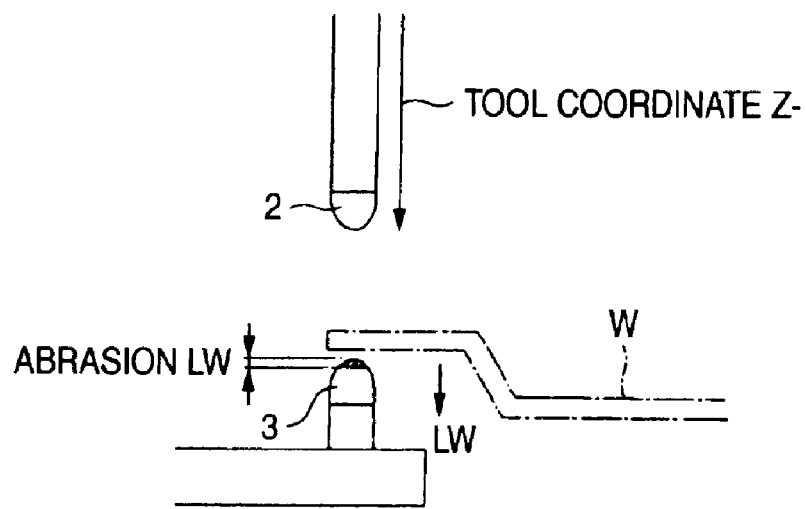
FIG. 7 is an explanatory view showing a correcting operation based on the amount of abrasion in an air type.

While the application to the stationary type gun using the servomotor 4 as a driving source has been described above, brief description will be given to detection to be carried out in case of a conventional type air cylinder or a stationary type gun using an oil pressure with reference to FIG. 7.

In a detecting operation, the detection is carried out by an electrode end detecting device in which a movable side electrode and a fixing side electrode are attached to a hand in the same manner as in the first or second embodiment. When a correcting operation is to be carried out as shown in FIG. 7, it is sufficient that the robot R is simply caused to correct the workpiece W by the amount LW of abrasion on a fixing side in a tool coordinate—direction differently from an electric operation type.

By detecting the amount of abrasion of the electrode of the stationary type gun through the method described above and carrying out shift, i.e., correction in welding and pressurization by the amount of abrasion, quality of the welding can be stabilized still more.

Moreover, the amounts of abrasion of both electrodes are monitored by a controller. When the threshold of the abrasion is reached, therefore, the exchange of the electrode can also be demanded on the spot. In the case in which the amount of abrasion of a chip is rapidly increased excessively in the detection, furthermore, it is a matter of course that chip missing can technically be detected.

In addition, the electrode end detecting device can also be attached to the complicated hand of the robot without great cares and a maintainability can also be prevented from being hindered. In respect of a cost, there is such an advantage that the cost can be considerably reduced, for example, the gun can have an equalizing function or the hand can have a floating device.

While an electric type welding gun using a servomotor has spread, it is possible to carry out pressurization in a state in which the positional relationship of an electrode chip for a workpiece can always be maintained by grasping the amounts of abrasion of the fixing side electrode and the movable side electrode with the hand of a robot having a detecting device which is easily attached to the robot and taking the amount of abrasion into account to put a workpiece in a stationary type welding gun and to carry out correction. Consequently, it is possible to obtain welding which is stable in respect of quality of the welding. Although the correction is carried out over only the fixing side electrode in air type and hydraulic stationary guns, moreover, the quality of the welding can be more enhanced than that in conventional non-correcting pressurization.

In the invention, furthermore, expensive means such as an equalizing mechanism or a floating device is not required but there is such an advantage that teaching and detection can easily be carried out by a robot and an electrode can readily be managed.

INDUSTRIAL APPLICATION

The invention is useful for a method and apparatus for detecting the abrasion of an electrode of a stationary type welding gun.

What is claimed is:

1. A method for detecting abrasion of both a moving side electrode and a fixing side electrode of a stationary type welding gun, wherein the fixing side electrode is provided at a position opposed to the moving side electrode, and a workpiece held by a robot is to be welded, the method comprising:

reading reference positions of electrode ends of both of the electrodes, by an electrode end detecting device attached to the robot, prior to welding, detecting positions of the electrode ends, by the electrode end detecting device, during welding, and calculating amounts of abrasion of both of the electrodes from a difference between the reference positions and the detected positions.

2. An apparatus for detecting abrasion of an electrode of a stationary type welding gun, comprising:

an electrode end detecting device for detecting electrode ends of both a moving side electrode and a fixing side electrode of the stationary type welding gun, wherein the fixing side electrode is provided at a position opposed to the moving side electrode, and the electrode end detecting device is attached to a robot, and a calculating section for reading reference positions of the electrode ends of both of the electrodes by the electrode end detecting device, then detecting positions of the electrode ends by the electrode end detecting device during welding, and calculating amounts of abrasion of both of the electrodes from a difference between the reference positions and the detected positions.

* * * * *